United States Patent
Ricci

(10) Patent No.: US 6,982,645 B2
(45) Date of Patent: Jan. 3, 2006

(54) DEVICE FOR DETECTING THE PRESENCE OF A TRANSPONDER AROUND THE DEVICE

(75) Inventor: Claudio Ricci, Corso Italia, 52, 20025 Legnano (IT)

(73) Assignees: Claudio Ricci, Legnano (IT); Overton Consultadoria E Serviços LDA, Funchal Madeira (PT)

(*) Notice: Subject to any disclaimer, the term of this patent is extended or adjusted under 35 U.S.C. 154(b) by 34 days.

(21) Appl. No.: 10/627,635

(22) Filed: Jul. 28, 2003

(65) Prior Publication Data

US 2004/0113755 A1    Jun. 17, 2004

(30) Foreign Application Priority Data

Jul. 29, 2002    (IT) .......................... MI2002A1685

(51) Int. Cl.
   *G08B 13/14*    (2006.01)
(52) U.S. Cl. .............................. 340/572.1; 340/572.2; 340/572.4
(58) Field of Classification Search ............. 340/572.1, 340/572.2, 572.4
   See application file for complete search history.

(56) References Cited

U.S. PATENT DOCUMENTS

| | | | | |
|---|---|---|---|---|
| 3,836,842 A | * | 9/1974 | Zimmermann et al. | 324/239 |
| 4,512,000 A | * | 4/1985 | Masuko | 367/93 |
| 5,083,113 A | * | 1/1992 | Slawinski et al. | 340/572.4 |
| 5,661,470 A | * | 8/1997 | Karr | 340/10.33 |
| 5,790,031 A | * | 8/1998 | Shelton et al. | 340/572.4 |
| 6,693,512 B1 | * | 2/2004 | Frecska et al. | 340/10.1 |

* cited by examiner

*Primary Examiner*—Thomas J. Mullen, Jr.
*Assistant Examiner*—Travis R. Hunnings
(74) *Attorney, Agent, or Firm*—Daniel O'Byrne

(57) ABSTRACT

A device for detecting the presence of a transponder in its vicinity is provided, which comprises an antenna, a pulse generation unit, a unit adapted to feed the antenna with the pulses and a unit for measuring the damped oscillations of the antenna as a consequence of being fed with the pulses, the unit for measuring the damped oscillations of the antenna determining whether a transponder is present or not in the vicinity of the antenna on the basis of the characteristics of the damped oscillations.

22 Claims, 2 Drawing Sheets

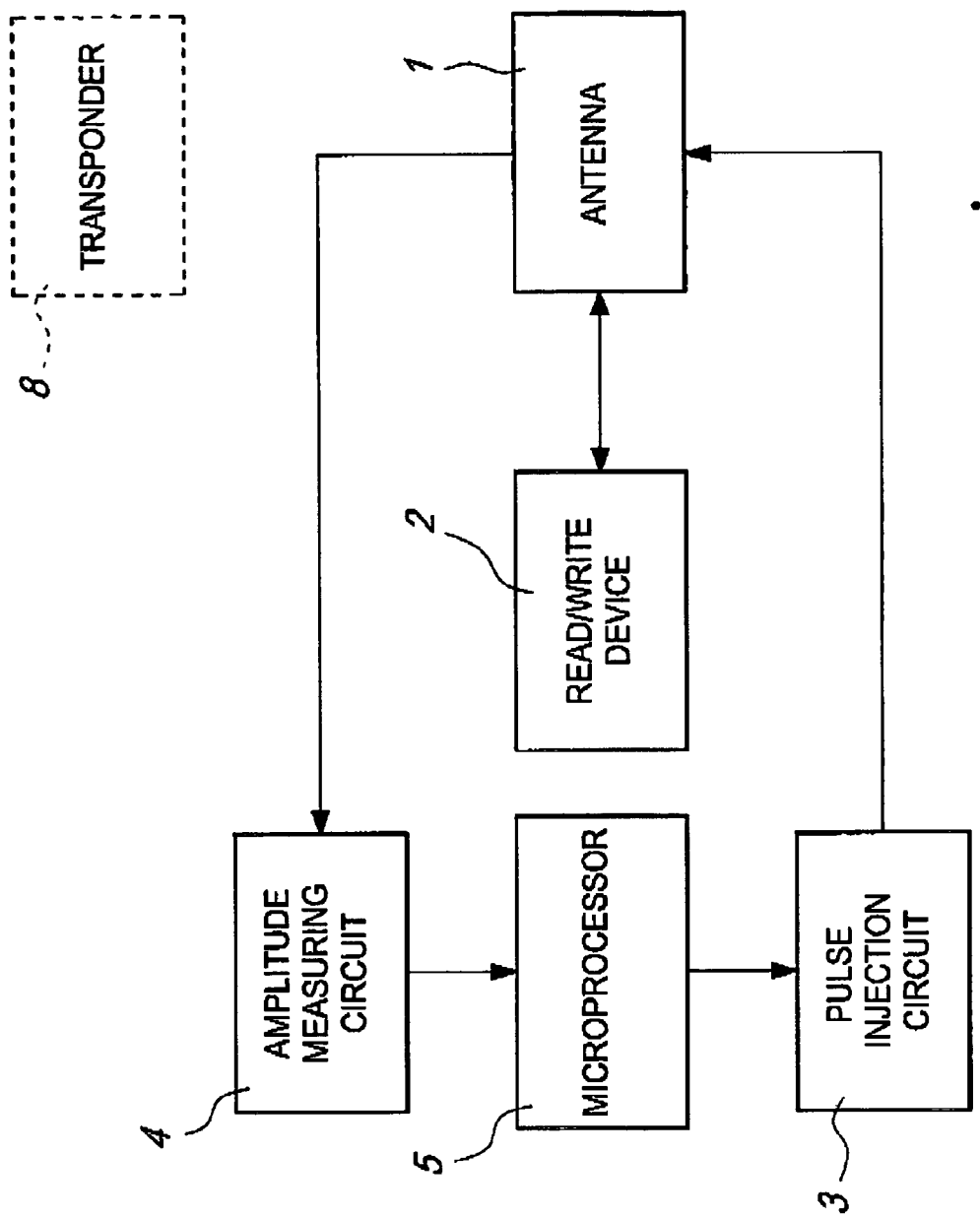

DEVICE FOR DETECTING THE PRESENCE OF A TRANSPONDER AROUND THE DEVICE

BACKGROUND OF THE INVENTION

The present invention relates to a device adapted to detect the presence of a resonant circuit of a passive or active transponder in its proximity, without requiring contact between the device and the resonant circuit.

Devices for reading or writing passive or active transponders require a significant amount of energy for their operation. If these devices are applied in battery-operated units, the consumption of the entire unit must be as low as possible so as to ensure the longest possible operating endurance. Devices for reading or writing active or passive transponders are usually applied to battery-operated units by means of auxiliary electronic activation circuits, capable of activating communication with the transponder when a transponder is believed to be present, in order to minimize consumption. Examples of embodiments in this regard are units that are activated by means of buttons or by means of detectors for sensing the presence of the hand or of the person, of the infrared or other type, such as to activate the unit only if a person is located very close to the reading and writing device of said unit. The main drawbacks of such embodiments consist in that the unit is activated even in the absence of the transponder, i.e., of the resonant circuit, and they are also costly, since they require additional components that are independent of the read-write circuit.

SUMMARY OF THE INVENTION

The aim of the present invention is to provide a device that is adapted to detect the presence of a transponder in its proximity without contact between the device and the transponder.

Within this aim, an object of the present invention is to provide a device adapted to detect the presence of a transponder in its proximity that does not require the presence of additional components with respect to those normally provided in order to read or write the transponder.

Another object of the present invention is to provide a device that is highly reliable, relatively simple to provide, and at competitive costs.

This aim and these and other objects that will become better apparent hereinafter are achieved by a device for detecting the presence of a transponder in its proximity, characterized in that it comprises:
an antenna;
pulse generation means;
means adapted to feed said antenna with said pulses;
means for measuring the damped oscillations of said antenna as a consequence of being fed with said pulses;
said means for measuring the damped oscillations of said antenna determining whether a transponder is present or not in the proximity of said antenna on the basis of the characteristics of said damped oscillations.

BRIEF DESCRIPTION OF THE DRAWINGS

Further characteristics and advantages of the invention will become better apparent from the description of preferred but not exclusive embodiments of the device according to the present invention, illustrated by way of non-limitative example in the accompanying drawings, wherein:

FIG. 1 is a block diagram of the device according to the present invention; and

DESCRIPTION OF THE PREFERRED EMBODIMENTS

Figure 2A:
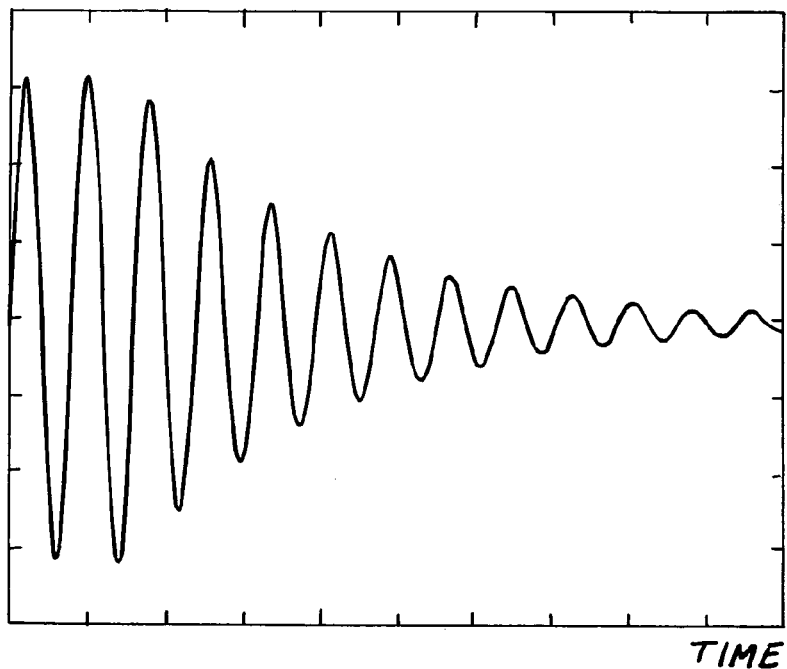
FIGS. 2a and 2b are charts that plot examples of detection of damped oscillations, respectively in the absence and in the presence of a transponder.

With reference to the figures, the device according to the invention comprises an antenna 1, which is part of a device 2 for reading and/or writing a transponder 8 and to which a pulse injection circuit 3 and a circuit 4 for measuring the amplitude of the oscillations of the signal 4 are connected. Said circuits are connected to a microcontroller or microprocessor 5 or other circuit capable of performing the operations described hereinafter.

By means of the microcontroller or microprocessor or other device 5, a series of synchronous pulses is generated periodically; said pulses feed the antenna 1 by means of the pulse injection circuit 3. At the end of the pulse generation, the amplitudes of the characteristic damped oscillations of the antenna 1 are measured by means of the signal oscillation amplitude measurement circuit 4: in the presence of a transponder in the vicinity of the antenna 1, the measurement of the amplitudes of the characteristic damped oscillations of said antenna 1 is lower, since the presence of the transponder 8 absorbs a fraction of the energy that is present in the antenna 1.

Figure 2B:
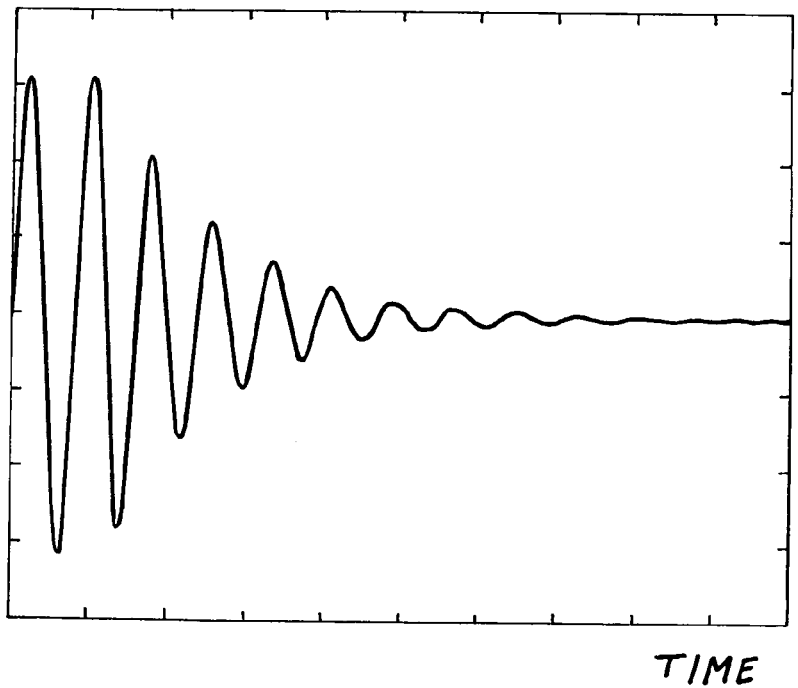

FIGS. 2a and 2b illustrate an example of sensing of the amplitude of the characteristic damped oscillations of the antenna 1 in the absence of a transponder (FIG. 2a) or in the presence of a transponder (FIG. 2b); a more rapid damping of the oscillations in the presence of a transponder is evident.

The value comparable to the measurement of the amplitude of the characteristic damped oscillations of the antenna 1 and usable to define the presence of transponders can also be obtained by counting the number of characteristic damped oscillations of the antenna 1 whose amplitude exceeds a fixed value: again due to the absorption of a fraction of the energy of the antenna 1 by the transponder 8, such number, i.e., the oscillations made, is higher in the absence of the transponder 8 and lower in the presence of the transponder 8.

The microprocessor or microcontroller or other device 5 provides the operation described above through an operating sequence: the number of pulses intended for the antenna 1 and the periodicity with which the measurements are taken are parameters; the measurement of the amplitudes and/or the number of characteristic damped oscillations of the antenna 1 are variables that depend on the characteristics of the antenna 1, on the environmental operating characteristics, and on the presence or absence of the transponder or resonant circuit.

The operating sequence of the microprocessor or microcontroller or other device 5 provides for an analysis of the variables and for an adaptation of the parameters that automatically adapts the system to the slow variation of environmental operating conditions and to the specific antenna.

A method for providing this entails modifying the energy supplied to the antenna 1 (number of pulses or amplitude of the pulses or duration thereof) so as to obtain a constant number and/or constant amplitude of the characteristic damped oscillations of the antenna 1 in the absence of a transponder.

Another method instead entails keeping constant the energy supplied to the antenna 1 and storing as reference the average number and/or average amplitude of the damped oscillations whose amplitude exceeds a fixed level, these characteristics of the antenna 1 being obtained during the last measurements in the absence of a transponder.

A significant decrease of the value of the variables over a small time interval is interpreted by the microprocessor or microcontroller or other device 5 as the presence of the transponder, thus allowing to activate the unit associated with the device 2 for reading/writing the transponder 8.

The duration of the measurement and of the analysis, i.e., of the cycle required to determine the presence of the transponder, is on the order of magnitude of a millisecond and, as mentioned, is performed periodically: intervals of approximately 150 milliseconds between one cycle and the next allow to obtain sufficiently rapid response times, and therefore times for the possible activation of the apparatus connected to the device according to the present invention, with an average consumption that is compatible with the battery-based power supply of the unit.

In practice it has been found that the device according to the invention fully achieves the intended aim and objects, since it allows to determine, by means of the antenna of the device, the presence or absence of a transponder in the proximity of said device.

The device thus conceived is susceptible of numerous modifications and variations, all of which are within the scope of the appended claims; all the details may further be replaced with other technically equivalent elements.

The disclosures in Italian Patent Application no. MI2002A001685 from which this application claims priority are incorporated herein by reference.

What is claimed is:

1. A method for detecting the presence of a transponder in the proximity of a device provided with an antenna, comprising the steps consisting in:
    generating a series of pulses and feeding said antenna with said pulses;
    detecting the damped oscillations of said antenna;
    determining the presence/absence of said transponder on the basis of the characteristics of said oscillations,
    wherein said detecting comprises counting the number of said damped oscillations whose amplitude exceeds a preset threshold, said number being lower if said transponder is in the vicinity of said antenna with respect to when said transponder is not present.

2. The method according to claim 1, wherein said device provided with an antenna is a device for reading/writing said transponder.

3. The method according to claim 1, wherein the step consisting in feeding said antenna with said pulses comprises varying the number of said pulses and/or the amplitude of said pulses and/or the duration of said pulses so as to obtain damped oscillations of said antenna having a constant amplitude in the absence of said transponder, regardless of the type of antenna and of the environmental conditions.

4. The method according to claim 1, wherein the step consisting in feeding said antenna with said pulses comprises varying the number and/or amplitude and/or duration of said pulses, so as to keep constant to number of damped oscillations of said antenna.

5. The method according to claim 1, comprising the steps consisting in:
    storing the average amplitude of said damped oscillations of the antenna detected over a given time interval;
    comparing the stored average amplitude with the detected instantaneous amplitude and detecting significant variations of said instantaneous amplitude that indicate the presence of said transponder.

6. The method according to claim 1, comprising the steps consisting in:
    storing the average number of said damped oscillations of the antenna detected over a given time interval;
    comparing said average number of damped oscillations with the detected number of oscillations and detecting significant variations of said number of oscillations that indicate the presence of said transponder.

7. A device for detecting the presence of a transponder in its proximity, comprising:
    an antenna;
    pulse generation means;
    means adapted to feed said antenna with said pulses;
    means for measuring the damped oscillations of said antenna as a consequence of being fed with said pulses;
    said means for measuring the damped oscillations of said antenna being suitable to determine whether a transponder is present or not in the proximity of said antenna by counting the number of said damped oscillations whose amplitude exceeds a preset threshold, said number being lower if said transponder is in the vicinity of said antenna with respect to when said transponder is not present.

8. The device according to claim 7, wherein said device is a device for reading/writing said transponder and said antenna is the antenna of said read/write device.

9. The device according to claim 7, wherein said pulse generation means comprise a microprocessor or a microcontroller.

10. The device according to claim 7, wherein said means for measuring the damped oscillations of said antenna comprise a microprocessor or a microcontroller.

11. The device according to claim 7, wherein said means for feeding said antenna with said pulses comprise a microprocessor or a microcontroller.

12. The device according to claim 7, wherein said pulse generation means generate a series of synchronous pulses.

13. A method for detecting the presence of a transponder in the proximity of a device provided with an antenna, comprising the steps consisting in:
    generating a series of pulses and feeding said antenna with said pulses;
    detecting the damped oscillations of said antenna;
    determining the presence/absence of said transponder on the basis of the characteristics of said oscillations,
    wherein the step consisting in feeding said antenna with said pulses comprises varying the number of said pulses and/or the amplitude of said pulses and/or the duration of said pulses so as to obtain damped oscillations of said antenna having a constant amplitude in the absence of said transponder, regardless of the type of antenna and of the environmental conditions.

14. The method according to claim 13, wherein said device provided with an antenna is a device for reading/writing said transponder.

15. The method according to claim 13, wherein the step consisting in detecting the damped oscillations of said antenna comprises the step consisting in determining the amplitude of the damped oscillations of said antenna.

16. A device for detecting the presence of a transponder in its proximity, comprising:
    an antenna;
    pulse generation means;

means adapted to feed said antenna with said pulses;

means for measuring the damped oscillations of said antenna as a consequence of being fed with said pulses;

said means for measuring determining whether a transponder is present or not in the proximity of said antenna on the basis of the characteristics of said damped oscillations, wherein said means for measuring the damped oscillations of said antenna being suitable to vary the number of said pulses and/or the amplitude of said pulses and/or the duration of said pulses so as to obtain damped oscillations of said antenna having a constant amplitude in the absence of said transponder, regardless of the type of antenna and of the environmental conditions.

17. A method for detecting the presence of a transponder in the proximity of a device provided with an antenna, comprising the steps consisting in:

generatng a series of pulses and feeding said antenna with said pulses;

detecting the damped oscillations of said antenna;

determining the presence/absence of said transponder on the basis of the characteristics of said oscillations, wherein the step consisting in feeding said antenna with said pulses comprises varying the number and/or amplitude and/or duration of said pulses, so as to keep constant the number of damped oscillations of said antenna whose amplitude exceeds a preset threshold.

18. A device for detecting the presence of a transponder in its proximity, comprising:

an antenna;

pulse generation means;

means adapted to feed said antenna with said pulses;

means for measuring the damped oscillations of said antenna as a consequence of being fed with said pulses, said means for measuring determining whether a transponder is present or not in the proximity of said antenna on the basis of the characteristics of said damped oscillations, wherein said means for measuring the damped oscillations of said antenna being suitable to vary the number and/or amplitude and/or duration of said pulses, so as to keep constant the number of damped oscillations of said antenna whose amplitude exceeds a preset threshold.

19. A method for detecting the presence of a transponder in the proximity of a device provided with an antenna, comprising the steps consisting in:

generating a series of pulses and feeding said antenna with said pulses;

detecting the damped oscillations of said antenna;

determining the presence/absence of said transponder on the basis of the characteristics of said oscillations by storing the average amplitude of said damped oscillations of the antenna detected over a given time interval, comparing the stored average amplitude with the detected instantaneous amplitude and detecting significant variations of said instantaneous amplitude that indicate the presence of said transponder.

20. A device for detecting the presence of a transponder in its proximity, comprising:

an antenna;

pulse generation means;

means adapted to feed said antenna with said pulses;

means for measuring the damped oscillations of said antenna as a consequence of being fed with said pulses;

said means for measuring the damped oscillations of said antenna being suitable to determine the presence/absence of said transponder on the basis of the characteristics of said oscillations by storing the average amplitude of said damped oscillations of the antenna detected over a given time interval, comparing the stored average amplitude with the detected instantaneous amplitude and detecting significant variations of said instantaneous amplitude that indicate the presence of said transponder.

21. A method for detecting the presence of a transponder in the proximity of a device provided with an antenna, comprising the steps consisting in:

generating a series of pulses and feeding said antenna with said pulses;

detecting the damped oscillations of said antenna;

determining the presence/absence of said transponder on the basis of the characteristics of said oscillations by storing the average number of said damped oscillations of the antenna detected over a given time interval and whose amplitude exceeds a preset threshold, comparing said average number of damped oscillations with the detected number of oscillations whose amplitude exceeds a preset threshold and detecting significant variations of said number of oscillations that indicate the presence of said transponder.

22. A device for detecting the presence of a transponder in its proximity, comprising:

an antenna;

pulse generation means;

means adapted to feed said antenna with said pulses;

means far measuring the damped oscillations of said antenna as a consequence of being fed with said pulses;

said means for measuring the damped oscillations of said antenna being suitable to determine the presence/absence of said transponder on the basis of the characteristics of said oscillations by storing the average number of said damped oscillations of the antenna detected over a given time interval and whose amplitude exceeds a preset threshold, comparing said average number of damped oscillations with the detected number of oscillations whose amplitude exceeds a preset threshold and detecting significant variations of said number of oscillations that indicate the presence of said transponder.

* * * * *